(12) United States Patent
Goutham

(10) Patent No.: US 8,696,512 B1
(45) Date of Patent: Apr. 15, 2014

(54) POWERTRAIN ARCHITECTURE-POWERSPLIT HYBRID USING A SINGLE MOTOR

(71) Applicant: GM Global Technology Operations LLC, Detroit, MI (US)

(72) Inventor: Ethiraj Shivashankar Goutham, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/791,884

(22) Filed: Mar. 8, 2013

(51) Int. Cl.
*F16H 3/44* (2006.01)

(52) U.S. Cl.
USPC ............ 475/282; 475/302; 475/329; 903/910

(58) Field of Classification Search
CPC ... F16H 1/28; F16H 3/093; F16H 2003/0936; F16H 37/02; F16H 37/06; F16H 37/0826
USPC ......... 475/4, 5, 149, 151, 152, 198, 221, 218, 475/271, 282, 302, 329; 74/329, 331; 180/65.21, 65.225; 903/909, 910, 912, 903/945, 946
See application file for complete search history.

(56) References Cited

U.S. PATENT DOCUMENTS

| | | | | |
|---|---|---|---|---|
| 4,682,511 A * | 7/1987 | Wittke | ......................... | 475/218 |
| 6,638,193 B2 * | 10/2003 | Hamai | .............. | 475/5 |
| 2003/0069103 A1 * | 4/2003 | Ibamoto et al. | ................... | 475/5 |
| 2004/0224811 A1 * | 11/2004 | Vornehm et al. | .............. | 475/207 |
| 2005/0050974 A1 * | 3/2005 | Ibamoto et al. | ................. | 74/333 |
| 2005/0101432 A1 * | 5/2005 | Pels et al. | .......................... | 477/5 |
| 2009/0280942 A1 * | 11/2009 | Gumpoltsberger | ............. | 475/31 |
| 2010/0004092 A1 * | 1/2010 | Glatthaar et al. | ............. | 477/109 |
| 2013/0196805 A1 * | 8/2013 | Phillips | ............................ | 475/5 |

* cited by examiner

*Primary Examiner* — Justin Holmes

(57) ABSTRACT

An apparatus includes an electro-mechanical transmission including a transmission output shaft and first and second transmission input shafts selectively coupleable for rotation with a first torque generative device. A planetary gear set including first, second and third members and a reduction gear set selectively coupling the first transmission input shaft for rotation with the first member and selectively coupling the second transmission input shaft for rotation with the third member. A first gear set input shaft is selectively coupled for rotation with the first transmission input shaft and coupled for rotation with the reduction gear set. A second gear set input shaft is selectively coupleable for rotation with the second transmission input shaft and coupled for rotation with the reduction gear set. A second torque generative device is coupleable for rotation with one of the first and second gear set input shafts.

19 Claims, 3 Drawing Sheets

POWERTRAIN ARCHITECTURE-POWERSPLIT HYBRID USING A SINGLE MOTOR

TECHNICAL FIELD

This disclosure is related to powertrain systems employing multiple torque-generative devices.

BACKGROUND

The statements in this section merely provide background information related to the present disclosure. Accordingly, such statements are not intended to constitute an admission of prior art.

A powertrain includes a torque generative device providing torque to a shaft. A hybrid powertrain utilizes at least two torque generative devices, for example an internal combustion engine and one or more electric machines. Planetary gear sets including a ring gear, a sun gear, planet gears and planet carrier, may be employed in hybrid transmissions and configured to selectively receive and transmit torque through the various gear members. Clutch devices can selectively connect and disconnect various members within the powertrain, including various members of planetary gear sets.

A powertrain utilizing a rotational input torque through an input shaft to drive a transmission input shaft is known to utilize a transmission to change gear states establishing a relationship of the input to the output. Operation of the above devices within a powertrain requires management of numerous torque bearing shafts or devices representing connections to the engine, electrical machines, and transmission input shaft or driveline. Planetary gear sets and clutch devices are also known to be utilized within a transmission, providing a number of gear states that the transmission can be operated within based upon the configuration of the engaged and disengaged clutches and the transmission of torque through the various gears and gear sets within the planetary gear sets.

SUMMARY

An apparatus includes an electro-mechanical transmission including a transmission output shaft and first and second transmission input shafts selectively coupleable for rotation with a first torque generative device. A planetary gear set including first, second and third members and a reduction gear set selectively coupling the first transmission input shaft for rotation with the first member and selectively coupling the second transmission input shaft for rotation with the third member. A first gear set input shaft is selectively coupled for rotation with the first transmission input shaft and coupled for rotation with the reduction gear set. A second gear set input shaft is selectively coupleable for rotation with the second transmission input shaft and coupled for rotation with the reduction gear set. A second torque generative device is coupleable for rotation with one of the first and second gear set input shafts.

BRIEF DESCRIPTION OF THE DRAWINGS

One or more embodiments will now be described, by way of example, with reference to the accompanying drawings, in which.

DETAILED DESCRIPTION

Figure 1:
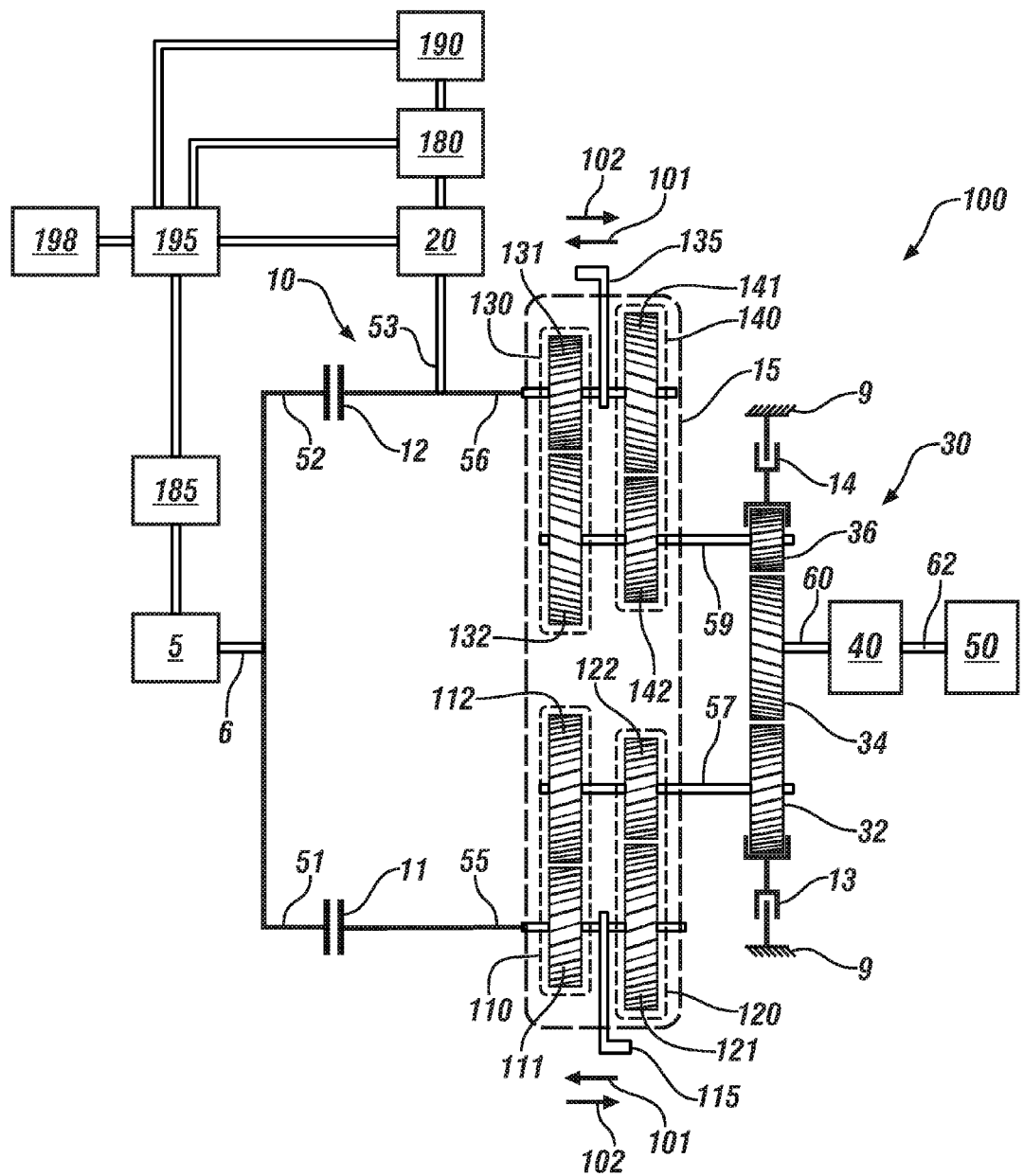
FIG. 1 illustrates an exemplary hybrid drive powertrain 100 including an engine, an electric machine, transmission and control system, in accordance with the present disclosure.

Referring now to the drawings, wherein the showings are for the purpose of illustrating certain exemplary embodiments only and not for the purpose of limiting the same, FIG. 1 schematically illustrates a hybrid powertrain 100 of a vehicle configured to transmit torque among a first torque generative device, a second torque generative device and a transmission output shaft, in accordance with the present disclosure. Specifically, the hybrid powertrain 100 includes an engine 5 (i.e., first torque generating device), a final drive mechanism 40, and an electrically-variable transmission 10 with first and second transmission input shafts 51, 52, respectively, coupled for rotation with an engine output shaft 6 of the engine 5 and the transmission output shaft 60 coupled for rotation with the final drive mechanism 40. The final drive mechanisms 40 can include a differential having a final drive output shaft 62 configured to distribute power to one or more wheels 50 of the vehicle. The transmission 10 includes a reduction gear set 15 and a planetary gear set 30. The transmission 10 provides a power split configuration capable of receiving at least a portion of its driving power from the engine 5 via at least one of first and second gear set input shafts 55, 56, respectively, in some of its operating modes, as discussed below.

The electrically-variable transmission 10 further includes an electric machine 20 (i.e., second torque generating device) coupled for rotation with the second gear set input shaft 56. In an alternative embodiment, the electric machine 20 can be coupled for rotation with the first gear set input shaft 55. A first end of the first gear set input shaft 55 is selectively coupled for rotation with the first transmission input shaft 51 and a second end of the first gear set input shaft 55 is selectively coupled for rotation with the reduction gear set 15. A first end of the second gear set input shaft 56 is selectively coupled for rotation with the second transmission input shaft 52 and a second end of the second gear set input shaft 56 is selectively coupled for rotation with the reduction gear set 15. The power split configuration of the transmission 10 is further capable of receiving at least a portion of its driving power from the electric machine 20 via the second gear set input shaft 56, in some of its operating modes, as discussed below. The transmission 10 is further capable of providing power from the engine 5 to the electric machine 20 in series for charging an energy storage device (ESD) 190, as discussed below. As will become apparent, the electro-mechanical transmission 10 may be selectively controllable to transmit power among at least one of the engine 5 and the electric machine 20 while operating the engine within an optimum power range and an optimum engine speed range.

Planetary gear set 30 has a first member that is a sun gear 32, a second member that is a carrier member 34 that rotatably supports a plurality of pinion gears meshing with the sun gear 32, and a third member that is a ring gear 36 meshing with the pinion gears. The carrier member 34 is coupled to the transmission output shaft 60 to provide rotation between the carrier member 34 and the final drive mechanism 40. A first end of a first transmission intermediate shaft 57 is coupled for rotation with the reduction gear set 15 and a second end of the first transmission intermediate shaft 57 is coupled for rotation with the sun gear 32 to provide rotation between the reduction gear set 15 and the sun gear 32. Accordingly, power can be transmitted from the first transmission intermediate shaft 57 to the transmission output shaft 60 at a sun-to-carrier ratio. A first end of a second transmission intermediate shaft 59 is coupled for rotation with the reduction gear set 15 and a second end of the second transmission intermediate shaft 59 is coupled for rotation with the ring gear 36 to provide rotation between the reduction gear set 15 and the ring gear 36. Accordingly, power can be transmitted from the second transmission intermediate shaft 59 to the transmission output shaft 60 at a ring-to-carrier ratio. In an exemplary embodiment, the sun-to-carrier ratio is greater than the ring-to-carrier ratio. In a non-limiting example, the sun-to-carrier ratio is 3.00 and the ring-to-carrier ratio is 1.50.

The reduction gear set 15 includes a first gear set 110, a second gear set 120, a third gear set 130 and a fourth gear set 140. The first gear set 110 selectively provides a first gear ratio between the first gear set input shaft 55 and the first transmission intermediate shaft 57. The second gear set 120 selectively provides a second gear ratio between the first gear set input shaft 55 and the first transmission intermediate shaft 57. The third gear set 130 selectively provides a third gear ratio between the second gear set input shaft 56 and the second transmission intermediate shaft 59. The fourth gear set 140 selectively provides a fourth gear ratio between the second gear set input shaft 56 and the second transmission intermediate shaft 59.

The first gear set 110 includes a first input member 111 and a first output member 112. The first input member 111 is coupled for rotation with the second end of the first gear set input shaft 55. The first output member 112 is coupled for rotation with the first transmission intermediate shaft 57, wherein rotation is permitted so long as the sun gear 32 is not grounded. The first input member 111 and the first output member 112 are engaged when a first synchronizer 115 is translated in a first direction 101. Accordingly, power can be transmitted from the first gear set input shaft 55 to the first transmission intermediate shaft 57 at the first gear ratio when the first synchronizer 115 engages the first input and output members 111, 112, respectively. In a non-limiting example, the first gear ratio is 3.0. Furthermore, power can be provided between the first gear input shaft 55 to the transmission output shaft 60 at a first multiplication ratio, wherein the first multiplication ratio is based on multiplying the first gear ratio by the sun-to-carrier ratio. In a non-limiting example, the first multiplication ratio is 9.00.

The second gear set 120 includes a second input member 121 and a second output member 122. The second input member 121 is coupled for rotation with the second end of the first gear set input shaft 55. The second output member 122 is coupled for rotation with the first transmission intermediate shaft 57, wherein rotation is permitted so long as the sun gear 32 is not grounded. The second input member 121 and the second output member 122 are engaged when the first synchronizer 115 is translated in a second direction 102. Accordingly, power can be transmitted from the first gear set input shaft 55 to the first transmission intermediate shaft 57 at the second gear ratio when the first synchronizer 115 engages the second input and output members 121, 122, respectively. In a non-limiting example, the second gear ratio is 1.75. Furthermore, power can be provided between the first gear set input shaft 55 to the transmission output shaft 60 at a second multiplication ratio, wherein the second multiplication ratio is based on multiplying the second gear ratio by the sun-to-carrier ratio. In a non-limiting example, the first multiplication ratio is 5.25.

Furthermore, when the first synchronizer 115 does not engage either the first input and output members 111, 112, respectively, or the second input and output members 121, 122, respectively, a neutral state exists between the first gear set input shaft 55 and the first transmission intermediate shaft 57, wherein each of the first input and output members 111, 112, respectively, and each of the second input and output members 121, 122, respectively, are freewheeling.

The third gear set 130 includes a third input member 131 and a third output member 132. The third input member 131 is coupled for rotation with the second end of the second gear set input shaft 56. The third output member 132 is coupled for rotation with the second transmission intermediate shaft 59, wherein rotation is permitted so long as the ring gear 36 is not grounded. The third input member 131 and the third output member 132 are engaged when a second synchronizer 135 is translated in the first direction 101. Accordingly, power can be transmitted from the second gear set input shaft 56 to the second transmission intermediate shaft 59 at the third gear ratio when the second synchronizer 135 engages the third input and output members 131, 132, respectively. In a non-limiting example, the second gear ratio is 3.00. Furthermore, power can be provided between the second gear set input shaft 56 to the transmission output shaft 60 at a third multiplication ratio, wherein the third multiplication ratio is based on multiplying the third gear ratio by the ring-to-carrier ratio. In a non-limiting example, the third multiplication ratio is 4.50.

The fourth gear set 140 includes a fourth input member 141 and a fourth output member 142. The fourth input member 141 is coupled for rotation with the second end of the second gear set input shaft 56. The fourth output member 142 is coupled for rotation with the second transmission intermediate shaft 59, wherein rotation is permitted so long as the ring gear 36 is not grounded. The fourth input member 141 and the fourth output member 142 are engaged when the second synchronizer 135 is translated in the second direction 102. Accordingly, power can be transmitted from the second gear set input shaft 56 to the second transmission intermediate shaft 59 at the fourth gear ratio when the second synchronizer 135 engages the third input and output members 141, 142, respectively. In a non-limiting example, the second gear ratio is 1.50. Furthermore, power can be provided between the second gear set input shaft 56 to the transmission output shaft 60 at a fourth multiplication ratio, wherein the fourth multiplication ratio is based on multiplying the fourth gear ratio by the ring-to-carrier ratio. In a non-limiting example, the fourth multiplication ratio is 2.25.

Similar to the first gear set input shaft 55 and the first transmission intermediate shaft 57 with respect to the first synchronizer 115, when the second synchronizer 135 does not engage either the third input and output members 131, 132, respectively, or the fourth input and output members 141, 142, respectively, a neutral state exists between the second gear set input shaft 56 and the second transmission intermediate shaft 59, wherein each of the third input and output members 131, 132, respectively, and each of the fourth input and output members 141, 142, respectively, are freewheeling.

The electric machine 20 has a rotor portion that is coupled for rotation with the second gear set input shaft 56 and a stator portion that is continuously grounded to a stationary member, e.g., ground 9, such as a casing of the transmission. In an alternative embodiment, the rotor portion may be coupled for common rotation with the first gear set input shaft 55. The electric machine 20 may receive electrical power from or provide electrical power to an energy storage device (ESD) 190 such as a high-voltage battery. A hybrid control module (HCP) 195 is in signal communication with the ESD 190 and with a power inverter 180 that is also in electrical communication with the stator portion of the electric machine 20. The HCP 195 responds to a variety of input signals including vehicle speed, operator power request (P_req), the level at which the ESD 190 is charged, e.g., state of charge (SOC), motor power ($P_A$) provided from the electric machine 20 to the transmission output shaft 60, and engine power ($P_E$) provided from the engine 5 to regulate the flow of power between the electric machine 20 and the ESD 190 via the inverter 180, which converts between direct current provided or utilized by the ESD 190 and alternating current provided or utilized by the stator portion of the electric machine 20. The HCP 195 has supervisory control over an engine control module (ECM) 185 configured to monitor inputs from sensors to determine states of engine parameters, such as engine speed and $P_E$ provided from the engine 5 to the transmission output shaft 60. The ECM 185 can further be configured to control actuators of the engine 5 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. The HCP 195 further has supervisory control over a user interface 198 which is operatively connected to receive inputs from a vehicle operator. For instance, the HCP 195 can coordinate power commands amongst the engine 5 and the electric machine 20 to establish desired operation of the transmission 10 in response to an operator input to the user interface 198. In one embodiment, the user input includes the operator power request, P_req. The user interface 198 can include an accelerator pedal, a brake pedal, cruise control and/or a gear selector level.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

The electrically-variable transmission 10 also includes a plurality of selectively engageable torque-transmitting devices C1 11, C2 12, C3 13 and C4 14. Torque-transmitting device 11, a rotating clutch, is selectively activated to couple the first transmission input shaft 51 and the first gear set input shaft 55 for common rotation with the engine output shaft 6. Torque-transmitting device 12, a rotating clutch, is selectively activated to couple the second transmission input shaft 52 and the second gear set input shaft 56 for common rotation with the engine output shaft 6. Torque-transmitting device 13, a stationary clutch, also referred to as a brake, is selectively activated to ground the sun gear 32 to a stationary member, e.g., ground 9. Torque-transmitting device 14, a stationary clutch, is selectively activated to ground the ring gear 36 to the stationary member 9. The HCP 195 can control activation and deactivation of the plurality of torque-transmitting devices C1 11, C2 12, C3 13 and C4 14 to establish desired operation of the hybrid powertrain 100 in one of a plurality of operating modes. The operating modes and corresponding clutch applications are set forth in Table 1, below.

TABLE 1

| Transmission | Applied Clutches | | | |
|---|---|---|---|---|
| Operating Range state | C1 11 | C2 12 | C3 13 | C4 14 |
| EV |   |   | X |   |
| EVT - Motoring | X |   |   |   |
| EVT - Generation | X |   |   |   |
| Engine - Low | X |   |   | X |
| Engine - High |   | X | X |   |
| Reverse |   |   | X |   |
| Series Charging |   | X |   |   |

The exemplary hybrid powertrain 100 of FIG. 1 can utilize various combinations of the engine 5 and the electric machine 20 to provide power to the transmission output shaft 60. An electric vehicle (EV) mode can be enabled when the state of charge (SOC) of the ESD 190 is greater than a first SOC threshold and the vehicle speed is less than a first vehicle speed threshold. In a non-limiting example, the first SOC threshold is predetermined at 55 percent and the first vehicle speed threshold is predetermined at 25 mph. The EV mode is capable of providing high loads at low vehicle speeds with power being provided solely from the electric machine 20 to the transmission output shaft 60. The EV mode is provided by activation of the torque-transmitting device C3 13 and deactivating the remaining torque-transmitting devices. When the torque-transmitting device C3 13 is activated, the sun gear 32 is held stationary and becomes a reaction member within the planetary gear set 30. When the torque-transmitting device C4 14 is deactivated, the ring gear 36 is permitted to rotate within the planetary gear set 30. It will be further appreciated that regenerative energy can be captured by the electric machine 20 when the vehicle is braking in the EV mode.

In the EV mode, motor power, $P_A$, is provided from the electric machine 20 through a selected one of the third and fourth gear sets 130, 140, respectively, to the second transmission intermediate shaft 59 and then through the ring gear 36 and the carrier member 34 to the transmission output shaft 60. Selection of one of the third and fourth gear sets 130, 140, respectively, can be based upon an operator power request, P_req, monitored by the user interface 198. For instance, the third gear ratio of the third gear set 130 provides higher torque, than the fourth gear ratio of the fourth gear set 140. As aforementioned, power can be transmitted from the second gear set input shaft 56 through the third gear set 130 to the second transmission intermediate shaft 59 when the second synchronizer 135 engages the third input and output members 131, 132, respectively. Likewise, power can be transmitted from the second gear set input shaft 56 through the fourth gear set 140 to the second transmission intermediate shaft 59 when the second synchronizer 135 engages the fourth input and output members 141, 142, respectively.

Figure 2:
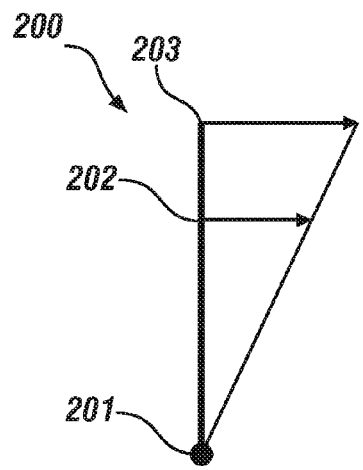
FIG. 2 illustrates an exemplary speed lever diagram corresponding to the powertrain of FIG. 1 operating in an electric vehicle (EV) mode, in accordance with the present disclosure.

FIG. 2 illustrates an exemplary speed lever diagram 200 corresponding to the powertrain 100 operating in the EV mode, in accordance with the present disclosure. The speed lever diagram 200 includes a first node 201 corresponding to the sun gear 32, a second node 202 corresponding to the carrier member 34, and a third node 203 corresponding to the ring gear 36 when the third gear set 130 is selected. In the illustrated example, the ring gear 36 and the carrier member 34 each include a respective magnitude of speed in a first direction corresponding to a forward direction of the vehicle. The magnitude of speed for the carrier member 34 is indicative of vehicle speed. The sun gear 32 is stationary because the torque-transmitting device C3 13 is activated.

Referring back to FIG. 1 with reference to Table 1, an electronically variable transmission (EVT) motoring mode can be enabled when the SOC of the ESD 190 is greater than the first SOC threshold and the vehicle speed is at least the first vehicle speed threshold. The EVT motoring mode provides power in combination from each of the engine 5 and the electric machine 20 to the transmission output shaft 60. The EVT motoring mode is provided by activation of the torque-transmitting device C1 11 and deactivating the remaining torque-transmitting devices. When the torque-transmitting device C1 11 is activated, the engine output shaft 6 and the first transmission input shaft 51 are coupled for common rotation with the first gear set input shaft 55. When the torque-transmitting device C3 13 is deactivated, the sun gear 32 is permitted to rotate within the planetary gear set 30. When the torque-transmitting device C4 14 is deactivated, the ring gear 36 is permitted to rotate within the planetary gear set 30. Thus, power is capable of being input to both the sun gear 32 via the first transmission intermediate shaft 57 and the ring gear 36 via the second transmission intermediate shaft 59. It will be appreciated that the electric machine 20 rotates in a first direction when operating as a motor in the EVT motoring mode.

In the EVT motoring mode, combinations of engine power, $P_E$, from the engine 5 and motor power, $P_A$, from the electric machine 20 are provided to the transmission output shaft 60 to achieve the P_req monitored by the user interface 198. It is desirable that the engine speed remain within a desired engine speed range. In a non-limiting example, the desired engine speed range is between and includes 2,000 RPM and 4,000 RPM. In an exemplary embodiment, a magnitude of $P_A$ is selected to accommodate a power deficit between the $P_E$ and the P_req so that the engine is permitted to operate within the desired engine speed range. However, any combination of $P_E$ and $P_A$ can be provided to the transmission output shaft 60 to meet the P_req.

In the illustrated embodiment of the EVT motoring mode, the $P_A$ is provided from the electric machine 20 through the fourth gear set 140 to the second transmission intermediate shaft 59 and then through the ring gear 36 and the carrier member 34 to the transmission output shaft 60. It will be appreciated that the second synchronizer 135 is translated in the second direction 102 to engage the fourth input and output member 141, 142, respectively. The $P_E$ is provided from the engine 5 via the first gear set input shaft 55 through a selected one of the first and second gear sets 110, 120, respectively, to the first transmission intermediate shaft 57 and then through the sun gear 32 and the carrier member 34 to the transmission output shaft 60. Selection of one of the first and second gear sets 110, 120, respectively, can be based on the engine speed. For instance, when the engine speed is less than a first engine speed threshold, the $P_E$ is provided through first gear set 110 as a default, wherein the first synchronizer 115 is translated in the first direction 101 to engage the first input and output members 111, 112, respectively. In a non-limiting example, the first engine speed threshold is predetermined at 3,000 RPM. Likewise, when the engine speed increases to at least the first engine speed threshold, the $P_E$ is provided through the second gear set 120, wherein the first synchronizer 115 is translated in the second direction 102 to engage the second input and output members 121, 122, respectively. Thus, selection of the second gear set 120 provides a lower gear ratio than the first gear set 110 during higher vehicle speeds so that the engine speed can remain within the desired engine speed range. It will be further appreciated that regenerative energy can be captured by the electric machine 20 when the vehicle is braking in the EVT motoring mode.

Figure 3A:
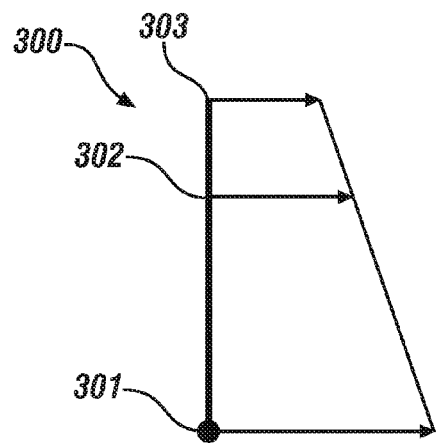
FIGS. 3A and 3B illustrate exemplary speed lever diagrams corresponding to the powertrain of FIG. 1 operating in an electronically variable transmission (EVT) motoring mode, in accordance with the present disclosure.

FIG. 3A illustrates an exemplary speed lever diagram 300 corresponding to the powertrain 100 operating in the EVT motoring mode, in accordance with the present disclosure. The speed lever diagram 300 includes a first node 301 corresponding to the sun gear 32 when the first gear set 110 is selected, a second node 302 corresponding to the carrier member 34, and a third node 303 corresponding to the ring gear 36 when the fourth gear set 140 is selected. In the illustrated example, the sun gear 32, carrier member 34 and the ring gear 36 each include a respective magnitude of speed in a first direction corresponding to a forward direction of the vehicle. The magnitude of speed for the carrier member 34 is indicative of vehicle speed.

Figure 3B:
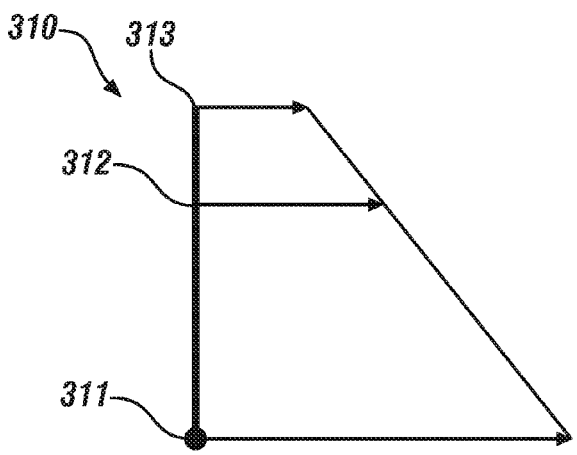

FIG. 3B illustrates an exemplary speed lever diagram 310 corresponding to the powertrain 100 operating in the EVT motoring mode, in accordance with the present disclosure. The speed lever diagram 310 includes a first node 311 corresponding to the sun gear 32 when the second gear set 120 is selected, a second node 312 corresponding to the carrier member 34, and a third node 313 corresponding to the ring gear 36 when the fourth gear set 140 is selected. In the illustrated example, the sun gear 32, carrier member 34 and the ring gear 36 each include a respective magnitude of speed in a first direction corresponding to a forward direction of the vehicle. The magnitude of speed for the carrier member 34 is indicative of vehicle speed.

Referring back to FIG. 1 with reference to Table 1, an electronically variable transmission (EVT) generation mode can be enabled when the SOC of the ESD 190 is less than the first SOC threshold and the operator power request, P_req, is less than an optimum engine power, $P_{E\_opt}$. In a non-limiting example, the $P_{E\_opt}$ is predetermined to equal 41 kW. Operation of the EVT generation mode is irrespective of vehicle speed, however the EVT generation mode is generally enabled during vehicle speeds less than a second vehicle speed threshold. In a non-limiting example, the second vehicle speed threshold is predetermined at 40 mph. The EVT generation mode provides power from the engine 5 to the transmission output shaft 60 for driving the vehicle, while the electric machine 20 operates as a generator to store energy converted from excess engine power, $P_E$, produced by the engine 5 for storage within the ESD 190. The energy converted from the excess $P_E$ can be referred to as generator power, $P_{GEN}$, and can be determined in accordance with the following relationship.

$$P_{GEN} = P_E - P_{\_req} \quad [1]$$

wherein
$P_{GEN}$ is the generator power,
$P_E$ is the engine power, and
$P_{\_req}$ is the operator power request.

The EVT generation mode is provided by activation of the torque-transmitting device C1 11 and deactivating the remaining torque-transmitting devices. When the torque-transmitting device C1 11 is activated, the engine output shaft 6 and the first transmission input shaft 51 are coupled for common rotation with the first gear set input shaft 55. When the torque-transmitting device C3 13 is deactivated, the sun gear 32 is permitted to rotate within the planetary gear set 30. When the torque-transmitting device C4 14 is deactivated, the ring gear 36 is permitted to rotate within the planetary gear set 30. Thus, power is capable of being input to the sun gear 32 via the first transmission intermediate shaft 57 and excess power is capable of being output from the ring gear 36 via the second transmission intermediate shaft 59. It will be appreciated that the electric machine 20 rotates in a second direction opposite to the first direction when operating as a generator in the EVT generation mode.

In the illustrated embodiment of the EVT generation mode, the $P_{GEN}$ is provided from the engine and is output from the ring gear 36 via the second transmission intermediate shaft 59 through a selected one of the third and fourth gear sets 130, 140, respectively, to the second gear set input shaft 56 and then through the electric machine 20 and the power inverter 180 for storage in the ESD 190 as electrical energy. Selection of the one of the third and fourth gear sets 130, 140, respectively, is based on the SOC of the ESD 190. In an exemplary embodiment, the fourth gear set 140 is selected as a default. However, this disclosure does not restricted to selecting the fourth gear set 140 and can include section of the third gear set 130 in the EVT generating mode. Additionally, the $P_E$ is provided from the engine 5 via the first gear set input shaft 55 through a selected one of the first and second gear sets 110, 120, respectively, to the first transmission intermediate shaft 57 and then through the sun gear 32 and the carrier member 34 to the transmission output shaft 60. Selection of one of the first and second gear sets 110, 120, respectively, can be based on the engine speed. For instance, when the engine speed is less than the first engine speed threshold, the $P_E$ is provided through the first gear set 110 as a default, wherein the first synchronizer 115 is translated in the first direction 101 to engage the first input and output members 111, 121, respectively. Thus, selection of the first gear set 110 provides a higher gear ratio than the second gear set 120 so that the vehicle can accelerate quicker. In a non-limiting example, the first engine speed threshold is predetermined at 3,000 RPM. Likewise, when the engine speed increases to at least the first engine speed threshold, the $P_E$ is provided through the second gear set 120, wherein the first synchronizer 115 is translated in the second direction 102 to engage the second input and output members 121, 122, respectively. Thus, selection of the second gear set 120 provides a lower gear ratio than the first gear set 110 as the vehicle speed increases so that the engine speed can remain within the desired engine speed range. It will be appreciated that when a total vehicle power, $P_{VEH}$, increases toward the $P_{E\_opt}$, the $P_{GEN}$ will accordingly reduce toward zero.

Figure 4A:
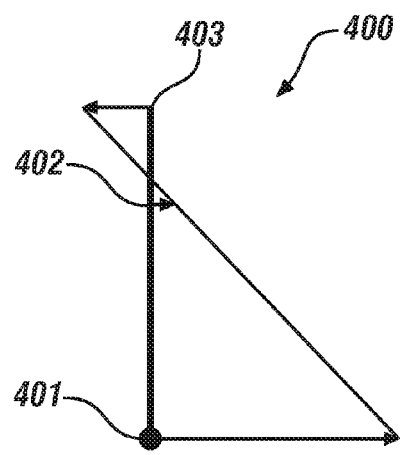
FIGS. 4A and 4B illustrate exemplary speed lever diagrams corresponding to the powertrain of FIG. 1 operating in an EVT generation mode, in accordance with the present disclosure.

FIG. 4A illustrates an exemplary speed lever diagram 400 corresponding to the powertrain 100 operating in the EVT generation mode, in accordance with the present disclosure. The speed lever diagram 400 includes a first node 401 corresponding to the sun gear 32 when the first gear set 110 is selected, a second node 402 corresponding to the carrier member 34, and a third node 403 corresponding to the ring gear 36 when the fourth gear set 140 is selected. The fourth gear set 140 may be selected as a default to provide increased torque for driving the electric machine 20 as a generator; however, as the P_req is increasing towards $P_{E\_OPT}$, the third gear set 130 may be selected as shown below in FIG. 4B. In the illustrated example, the sun gear 32 and carrier member 34 each include a respective magnitude of speed in a first direction corresponding to a forward direction of the vehicle. The magnitude of speed for the carrier member 34 is indicative of vehicle speed. However, the ring gear 36 includes a respective magnitude of speed in a second opposite direction corresponding to $P_{GEN}$ being output to the electric machine 20.

Figure 4B:
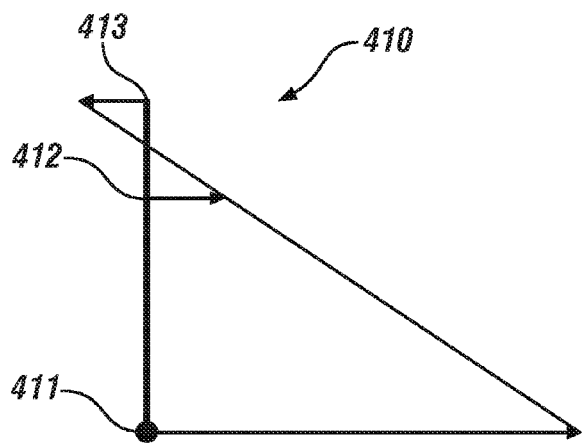

FIG. 4B illustrates an exemplary speed lever diagram 410 corresponding to the powertrain 100 operating in the EVT generation mode, in accordance with the present disclosure. The speed lever diagram 410 includes a first node 411 corresponding to the sun gear 32 when the second gear set 120 is selected, a second node 412 corresponding to the carrier member 34, and a third node 413 corresponding to the ring gear 36 when the third gear set 340 is selected. In the illustrated example, the sun gear 32 and carrier member 34 each include a respective magnitude of speed in a first direction corresponding to a forward direction of the vehicle. The magnitude of speed for the carrier member 34 is indicative of vehicle speed. However, the ring gear 36 includes a respective magnitude of speed in a second opposite direction corresponding to $P_{GEN}$ being output to the electric machine 20.

Referring back to FIG. 1 with reference to Table 1, Engine Low and Engine High modes can be enabled when the SOC of the ESD 190 is less than the first SOC threshold and the operator power request, P_req, is at least the optimum engine power, $P_{E\_opt}$. In a non-limiting example, the $P_{E\_opt}$ is predetermined to equal 41 kW. The Engine Low and High modes provide power solely from the engine to the transmission output shaft 60 to drive the vehicle. The Engine Low mode is indicative of lower vehicle speeds, e.g., 0 to 40 mph, and the Engine High mode is indicative of higher vehicle speeds, e.g., greater than 40 mph. Thus, the Engine Low mode may be enabled when the vehicle speed is less than a second vehicle speed threshold, e.g., 40 mph, and the Engine High mode may be enabled with the vehicle speed is at least the second vehicle speed threshold. As will become apparent, the Engine Low and High modes provide four forward fixed gear ratios of operation.

The Engine Low mode is provided by activating the torque-transmitting device C1 11 and the torque-transmitting device C4 14 and deactivating the torque transmitting device C2 12 and the torque-transmitting device C3 13. When the torque-transmitting device C1 11 is activated, the engine output shaft 6 and the first transmission input shaft 51 are coupled for rotation with the first gear set input shaft 55. When the torque-transmitting device C3 13 is deactivated, the sun gear 32 is permitted to rotate within the planetary gear set 30. When the torque-transmitting device C2 12 is deactivated, the engine output shaft 6 and the second transmission input shaft 52 are not coupled with the second gear set input shaft 56. When the torque-transmitting device C4 14 is activated, the ring gear 36 is held stationary and becomes a reaction member within the planetary gear set 30. Thus, $P_E$ from the engine 5 is capable of being input to the sun gear 32 via the first gear set input shaft 55. The Engine Low mode provides quick acceleration to achieve a desired vehicle speed based on the P_req.

In the Engine Low mode, $P_E$ is provided from the engine 20 via the first gear set input shaft 55 through a selected one of the first and second gear sets, 110, 120, respectively, to the first transmission intermediate shaft 57 and then through the sun gear 32 and the carrier member 34 to the transmission output shaft 60. Selection of the one of the first and second gear sets 110, 120, respectively, can be based on the engine speed. For instance, when the engine speed is less than the first engine speed threshold (e.g., 3,000 RPM), the $P_E$ is provided through the first gear set 110 as a default, wherein the first synchronizer 115 is translated in the first direction 101 to engage the first input and output members 111, 112, respectively. Thus, selection of the first gear set 110 provides a higher gear ratio than the second gear set 120 so that the vehicle can accelerate quicker. Likewise, when the engine speed increases to at least the first engine speed threshold, the $P_E$ is provided through the second gear set 120, wherein the first synchronizer 115 is translated in the second direction 102 to engage the second input and output members 121, 122, respectively. Thus, selection of the second gear set 120 provides a lower gear ratio than the first gear set 110 during higher vehicle speeds so that the engine speed can remain within the desired engine speed range.

Figure 5A:
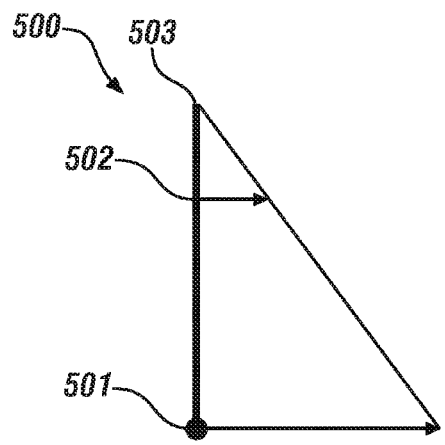
FIGS. 5A and 5B illustrate exemplary speed lever diagrams corresponding to the powertrain of FIG. 1 operating in an Engine Low mode, in accordance with the present disclosure.

FIG. 5A illustrates an exemplary speed lever diagram 500 corresponding to the powertrain 100 operating in the Engine Low mode, in accordance with the present disclosure. The speed lever diagram 500 includes a first node 501 corresponding to the sun gear 32 when the first gear set 110 is selected, a second node 502 corresponding to the carrier member 34, and a third node 503 corresponding to the ring gear 36. In the illustrated example, the sun gear 32 and carrier member 34 each include a respective magnitude of speed in a first direction corresponding to a forward direction of the vehicle. The magnitude of speed for the carrier member 34 is indicative of vehicle speed. The ring gear 36 is stationary because the torque-transmitting device C4 14 is activated.

Figure 5B:
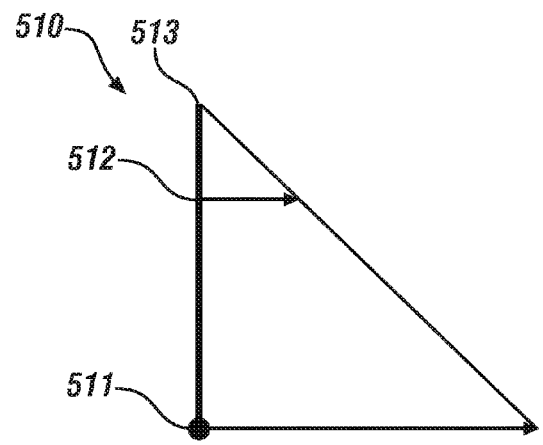

FIG. 5B illustrates an exemplary speed lever diagram 510 corresponding to the powertrain 100 operating in the Engine Low mode, in accordance with the present disclosure. The speed lever diagram 510 includes a first node 511 corresponding to the sun gear 32 when the second gear set 120 is selected, a second node 512 corresponding to the carrier member 34, and a third node 513 corresponding to the ring gear 36. In the illustrated example, the sun gear 32 and carrier member 34 each include a respective magnitude of speed in a first direction corresponding to a forward direction of the vehicle. The magnitude of speed for the carrier member 34 is indicative of vehicle speed. The ring gear 36 is stationary because the torque-transmitting device C4 14 is activated.

Referring back to FIG. 1 with reference to Table 1, the Engine High mode is provided by activation of the torque-transmitting device C2 12 and the torque-transmitting device C3 13 and deactivating the torque transmitting device C1 11 and the torque-transmitting device C4 14. In an exemplary embodiment, when the operating mode transitions from the Engine Low mode, the torque-transmitting device C3 13 is not activated until the rotational speed of the sun gear 32 is equal to zero. When the torque-transmitting device C2 12 is activated, the engine output shaft 6 and the second transmission input shaft 52 are coupled for common rotation with the second gear set input shaft 56. When the torque-transmitting device C4 14 is deactivated, the ring gear 36 is permitted to rotate within the planetary gear set 30. When the torque-transmitting device C1 11 is deactivated, the engine output shaft 6 and the first transmission input shaft 51 are not coupled with the first gear set input shaft 55. When the torque-transmitting device C3 13 is activated, the sun gear 32 is held stationary and becomes a reaction member within the planetary gear set 30. Thus, $P_E$ from the engine 5 is capable of being input to the ring gear 36 via the second gear set input shaft 56. The Engine High mode allows the transmission to achieve a desired vehicle speed while maintaining the engine speed within the engine speed threshold. Additionally, the electric machine 20 can operate as the generator, wherein a portion of the $P_E$ from the engine 5 is capable of driving the electric machine 20 as the generator for producing electric energy for storage in the ESD 190. It will be further appreciated that regenerative energy can be captured by the electric machine 20 when the vehicle is braking in the Engine High mode.

In the Engine High mode, $P_E$ is provided form the engine 20 via the second gear set input shaft 56 through a selected one of the third and fourth gear sets, 130, 140, respectively, to the second transmission intermediate shaft 59 and then through the ring gear 36 and the carrier member 34 to the transmission output shaft 60. Selection of the one of the third and fourth gear sets 130, 140, respectively, can be based on the vehicle speed using a shift map. For instance, when the vehicle speed corresponds to the third gear ratio on the shift map, the $P_E$ is provided through the third gear set 130, wherein the third synchronizer 135 is translated in the first direction 101 to engage the third input and output members 131, 132, respectively. Likewise, when the vehicle speed corresponds to the fourth gear ratio on the shift map, the $P_E$ is provided through the fourth gear set 140, wherein the second synchronizer 135 is translated in the second direction 102 to engage the fourth input and output members 141, 142, respectively.

Figure 6A:
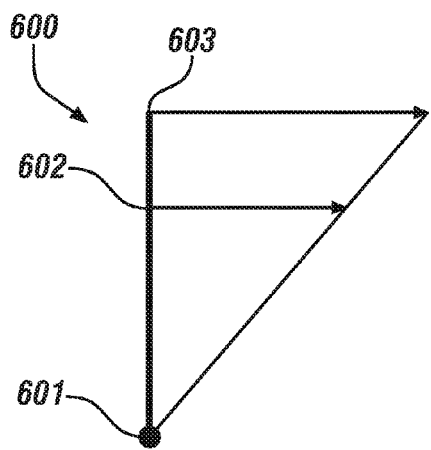
FIGS. 6A and 6B illustrate exemplary speed lever diagrams corresponding to the powertrain of FIG. 1 operating in an Engine High mode, in accordance with the present disclosure.

FIG. 6A illustrates an exemplary speed lever diagram 600 corresponding to the powertrain 100 operating in the Engine High mode, in accordance with the present disclosure. The speed lever diagram 600 includes a first node 601 corresponding to the sun gear 32, a second node 602 corresponding to the carrier member 34, and a third node 603 corresponding to the ring gear 36 when the third gear set 130 is selected. In the illustrated example, the ring gear 36 and carrier member 34 each include a respective magnitude of speed in a first direction corresponding to a forward direction of the vehicle. The magnitude of speed for the carrier member 34 is indicative of vehicle speed. The sun gear 32 is stationary because the torque-transmitting device C3 13 is activated.

Figure 6B:
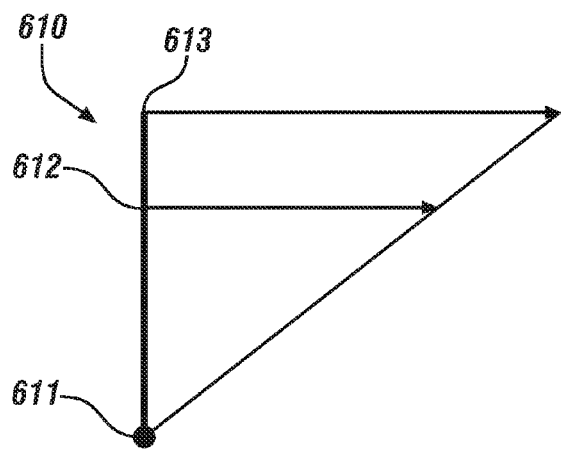

FIG. 6B illustrates an exemplary speed lever diagram 610 corresponding to the powertrain 100 operating in the Engine High mode, in accordance with the present disclosure. The speed lever diagram 610 includes a first node 611 corresponding to the sun gear 32 when the fourth gear set 140 is selected, a second node 612 corresponding to the carrier member 34, and a third node 613 corresponding to the ring gear 36. In the illustrated example, the ring gear 36 and carrier member 34 each include a respective magnitude of speed in a first direction corresponding to a forward direction of the vehicle. The magnitude of speed for the carrier member 34 is indicative of vehicle speed. The sun gear 32 is stationary because the torque-transmitting device C3 13 is activated.

Referring back to FIG. 1 with reference to Table 1, a Reverse mode can be enabled when the SOC of the ESD 190 is at least a second SOC threshold. In a non-limiting example, the second SOC threshold is predetermined at 20 percent. The Reverse mode provides power solely from the electric machine 20 in an opposite direction to the transmission output shaft 60. It will be appreciated that the opposite direction corresponds to a direction opposite to that of the power provided from the electric machine 20 in the EV mode. The Reverse mode is provided by activation of the torque-transmitting device C3 13 and deactivating the remaining torque-transmitting devices. When the torque-transmitting device C3 13 is activated, the sun gear 32 is held stationary and becomes a reaction member within the planetary gear set 30. When the torque-transmitting device C4 14 is deactivated, the ring gear 36 is permitted to rotate within the planetary gear set 30.

In the Reverse mode, electric machine power, $P_A$, is provided from the electric machine 20 through the third gear set 130 to the second transmission intermediate shaft 59 and then through the ring gear 36 and the carrier member 34 to the transmission output shaft 60. In one embodiment, when the SOC of the ESD 190 is less than the second SOC threshold, the torque-transmitting device C2 12 can be activated to couple the engine output shaft 6 and the second transmission input shaft 52 for common rotation with the second gear set input shaft 56. Accordingly, $P_E$ can be provided from the engine 5 to drive the electric machine 20 as the generator to produce electric energy for storage in the ESD 190.

Figure 7:
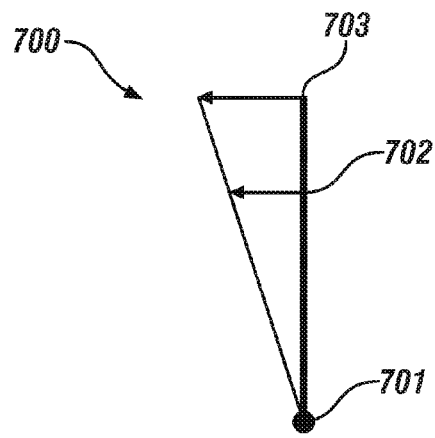
FIG. 7 illustrates an exemplary speed lever diagram corresponding to the powertrain of FIG. 1 operating in a Series Charging mode, in accordance with the present disclosure.

FIG. 7 illustrates an exemplary speed lever diagram 700 corresponding to the powertrain 100 operating in the Reverse mode, in accordance with the present disclosure. The speed lever diagram 700 includes a first node 701 corresponding to the sun gear 32, a second node 702 corresponding to the carrier member 34, and a third node 703 corresponding to the ring gear 36 when the third gear set 130 is selected. In the illustrated example, the ring gear 36 and the carrier member 34 each include a respective magnitude of speed in a second direction corresponding to a reverse direction of the vehicle. The magnitude of speed for the carrier member 34 is indicative of vehicle speed. The sun gear 32 is stationary because the torque-transmitting device C3 13 is activated.

Referring back to FIG. 1 with reference to Table 1, a Series Charging mode can be enabled when the vehicle is stopped, a key-OFF event has not been performed, and the SOC of the ESD 190 is less than the first SOC threshold, e.g., less than 55 percent. The Series Charging mode provides power from the engine 5 to drive the electric machine 20 as the generator to produce electrical energy for storage in the ESD 190. The Series Charging mode is provided by activation of the torque-transmitting device C2 12 and deactivating the torque-transmitting devices C1 11, C13, and C14. When the torque-transmitting device C2 12 is activated, the engine output shaft 6 and the second transmission input shaft 52 are coupled for common rotation with the second gear set input shaft 56. When the torque-transmitting device C4 14 is deactivated, the ring gear 36 is permitted to rotate within the planetary gear set 30. When the torque-transmitting device C3 13 is deactivated, the sun gear 32 is permitted to rotate within the planetary gear set 30. When the torque-transmitting device C1 11 is deactivated, the engine output shaft 6 and the first transmission input shaft 51 are not coupled to the first gear set input shaft 55. Additionally, the first and second synchronizers 115, 135, respectively, are in the neutral state, and thus, none of the respective input and output members of the gear sets 110, 120, 130, and 140 are engaged. In the Series Charging mode, engine power, $P_E$, is provided from the engine 5 via the second gear set input shaft 56 to drive the electric machine 20 as the generator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus transmitting torque among a first torque generative device, a second torque generative device and an output shaft, comprising:
an electro-mechanical transmission including a transmission output shaft and first and second transmission input shafts selectively coupleable for rotation with the first torque generative device, the electro-mechanical transmission further comprising
a planetary gear set including first, second and third members, the second member coupled for common rotation with the transmission output shaft;
a first selectively engageable brake configured to ground the first member of the planetary gear set when activated;
a second selectively engageable brake configured to ground the third member of the planetary gear set when activated;
a reduction gear set selectively coupling the first transmission input shaft for rotation with the first member of the planetary gear set and selectively coupling the second transmission input shaft for rotation with the third member of the planetary gear set;
first and second gear set input shafts,
said first gear set input shaft including a respective first end selectively coupleable for rotation with the first transmission input shaft and a respective second end coupled for rotation with the reduction gear set, and
said second gear set input shaft including a respective first end selectively coupleable for rotation with the second transmission input shaft and a respective second end coupled for rotation with the reduction gear set; and
the second torque generative device coupled for rotation with one of the first and second gear set input shafts.

2. The apparatus of claim 1, further comprising:
a first transmission intermediate shaft including a respective first end coupled for rotation with the reduction gear set and a respective second end coupled for rotation with the first member of the planetary gear set; and
a second transmission intermediate shaft including a respective first end coupled for rotation with the reduction gear set and a respective second end coupled for rotation with the third member of the planetary gear set.

3. The apparatus of claim 1, wherein the reduction gear set comprises:
a first gear set selectively providing a first gear ratio between the first gear set input shaft and the first member of the planetary gear set;
a second gear set selectively providing a second gear ratio between the first gear set input shaft and the first member of the planetary gear set;
a third gear set selectively providing a third gear ratio between the second gear set input shaft and the third member of the planetary gear set; and
a fourth gear set selectively providing a fourth gear ratio between the second gear set input shaft and the third member of the planetary gear set.

4. The apparatus of claim 3, further comprising:
the first gear set including a first input member and a first output member, the first gear ratio only provided when the first input and output members are engaged;
the second gear set including a second input member and a second output member, the second gear ratio only provided when the second input and output members are engaged;

the third gear set including a third input member and a third output member, the third gear ratio only provided when the third input and output members are engaged; and the fourth gear set including a fourth input member and a fourth output member, the fourth gear ratio only provided when the fourth input and output members are engaged.

5. The apparatus of claim 4, further comprising a first synchronizer and a second synchronizer:
   wherein said first input and output members are engaged when the first synchronizer is translated in a first direction;
   wherein said second input and output members are engaged when the first synchronizer is translated in a second direction;
   wherein said third input and output members are engaged when the second synchronizer is translated in the first direction; and
   wherein said fourth input and output members are engaged when the second synchronizer is translated in the second direction.

6. An apparatus transmitting torque among a first torque generative device, a second torque generative device and an output shaft, comprising:
   an electro-mechanical transmission including a transmission output shaft and first and second transmission input shafts selectively coupleable for rotation with the first torque generative device, the electro-mechanical transmission further comprising
      a planetary gear set including first, second and third members, the second member coupled for common rotation with the transmission output shaft;
      a reduction gear set selectively coupling the first transmission input shaft for rotation with the first member of the planetary gear set and selectively coupling the second transmission input shaft for rotation with the third member of the planetary gear set;
      first and second gear set input shafts,
         said first gear set input shaft including a respective first end selectively coupleable for rotation with the first transmission input shaft and a respective second end coupled for rotation with the reduction gear set, and
         said second gear set input shaft including a respective first end selectively coupleable for rotation with the second transmission input shaft and a respective second end coupled for rotation with the reduction gear set;
      the second torque generative device coupled for rotation with one of the first and second gear set input shafts;
      a first selectively engageable torque-transmitting device coupling the first transmission input shaft and the first gear set input shaft for common rotation with the engine when activated;
      a second selectively engageable torque-transmitting device coupling the second transmission input shaft and the second gear set input shaft for common rotation with the engine when activated;
      a third selectively engageable torque-transmitting device grounding the first member of the planetary gear set when activated; and
      a fourth selectively engageable torque-transmitting device grounding the third member of the planetary gear set when activated.

7. A hybrid powertrain of a vehicle transmitting torque among an engine, an electric machine and a transmission output shaft, comprising:
   an electro-mechanical transmission including the transmission output shaft and first and second transmission input shafts selectively coupleable for rotation with the engine, the electro-mechanical transmission further comprising
      a first gear set input shaft including a respective first end selectively coupleable for rotation with the first transmission input shaft;
      a second gear set input shaft including a respective first end selectively coupleable for rotation with the second transmission input shaft;
      a planetary gear set including a sun gear, a carrier member that rotatably supports a plurality of pinion gears meshing with the sun gear, and a ring gear meshing with the pinion gears, the carrier member coupled for rotation with the transmission output shaft;
      a reduction gear set selectively coupling a second end of the first gear set input shaft for rotation with the sun gear and selectively coupling a second end of the second gear set input shaft for rotation with the ring gear, the reduction gear set including
         a first gear set selectively providing a first gear ratio between the first gear set input shaft and the sun gear,
         a second gear set selectively providing a second gear ratio between the first gear set input shaft and the sun gear,
         a third gear set selectively providing a third gear ratio between the second gear set input shaft and the ring gear, and
         a fourth gear set selectively providing a fourth gear ratio between the second gear set input shaft and the ring gear;
      an electric machine coupled for rotation with the second gear set input shaft;
      a first selectively engageable torque-transmitting device coupling the first transmission input shaft and the first gear set input shaft for common rotation with the engine when activated;
      a second selectively engageable torque-transmitting device coupling the second transmission input shaft and the second gear set input shaft for common rotation with the engine when activated;
      a third selectively engageable torque-transmitting device grounding the first member of the planetary gear set when activated;
      a fourth selectively engageable torque-transmitting device grounding the third member of the planetary gear set when activated; and
   an energy storage device.

8. The apparatus of claim 7, wherein the hybrid powertrain is operative in an electric vehicle (EV) mode when the third selectively engageable torque-transmitting device is activated and the first, second and fourth selectively engageable torque-transmitting devices are deactivated.

9. The apparatus of claim 8, wherein the EV mode is enabled when a state of charge of the energy storage device is greater than a predetermined state of charge threshold and a vehicle speed is less than a predetermined vehicle speed threshold.

10. The apparatus of claim 7, wherein the hybrid powertrain is operative in an electronically variable transmission (EVT) motoring mode when the first selectively engageable torque-transmitting device is activated, and the second, third and fourth selectively engageable torque-transmitting devices are deactivated.

11. The apparatus of claim 10, wherein the EVT motoring mode is enabled when a state of charge of the energy storage device is greater than a predetermined first state of charge threshold and a vehicle speed is at least a predetermined vehicle speed threshold.

12. The apparatus of claim 7, wherein the hybrid powertrain is operative in an electronically variable transmission (EVT) generation mode when the first selectively engageable torque-transmitting device is activated, and the second, third and fourth selectively engageable torque-transmitting devices are deactivated.

13. The apparatus of claim 12, wherein the EVT generation mode is enabled when a state of charge of the energy storage device is less than a predetermined state of charge threshold and an operator power request is less than a predetermined optimum engine power.

14. The apparatus of claim 7, wherein the hybrid powertrain is operative in an engine low mode when the first and fourth selectively engageable torque-transmitting devices are activated and the second and third selectively engageable torque-transmitting devices are deactivated.

15. The apparatus of claim 14, wherein the engine low mode is enabled when a state of charge of the energy storage device is less than a predetermined state of charge threshold, a predetermined operator power request is at least an optimum engine power and a vehicle speed is less than a predetermined vehicle speed threshold.

16. The apparatus of claim 7, wherein the hybrid powertrain is operative in an engine high mode when the second and third selectively engageable torque-transmitting devices are activated and the first and fourth selectively engageable torque-transmitting devices are deactivated.

17. The apparatus of claim 16, wherein the engine high mode is enabled when a state of charge of the energy storage device is less than a predetermined state of charge threshold, an operator power request is at least a predetermined optimum engine power and a vehicle speed is at least a predetermined vehicle speed threshold.

18. The apparatus of claim 7, wherein the hybrid powertrain is operative in a series charging mode when the second selectively engageable torque-transmitting devices are activated and the first, third and fourth selectively engageable torque-transmitting device are deactivated.

19. The apparatus of claim 18, wherein the series charging mode is enabled when a vehicle speed is equal to zero, a key-OFF event has not been performed, and a state of charge of the energy storage device is less than a predetermined state of charge threshold.

* * * * *